US006589636B2

(12) United States Patent
Emslander et al.

(10) Patent No.: US 6,589,636 B2
(45) Date of Patent: Jul. 8, 2003

(54) SOLVENT INKJET INK RECEPTIVE FILMS

(75) Inventors: Jeffrey O. Emslander, Afton, MN (US); David J. Kinning, Woodbury, MN (US); Diane L. Regnier, Stillwater, MN (US); Caroline M. Ylitalo, Stillwater, MN (US)

(73) Assignee: 3M Innovative Properties Company, St. Paul, MN (US)

(*) Notice: Subject to any disclaimer, the term of this patent is extended or adjusted under 35 U.S.C. 154(b) by 36 days.

(21) Appl. No.: 09/896,497

(22) Filed: Jun. 29, 2001

(65) Prior Publication Data

US 2003/0107635 A1 Jun. 12, 2003

(51) Int. Cl.$^{7}$ .......................... B32B 27/14; B32B 3/00

(52) U.S. Cl. ...................... 428/195; 428/343; 428/412; 428/423.1; 428/474.4; 428/480; 428/500

(58) Field of Search ............................. 428/195, 343, 428/412, 423.1, 474.4, 480, 500

(56) References Cited

U.S. PATENT DOCUMENTS

| | | | | | |
|---|---|---|---|---|---|
| 4,578,285 A | * | 3/1986 | Viola | ......................... | 427/209 |
| 4,686,118 A | | 8/1987 | Arai et al. | | |
| 5,102,737 A | | 4/1992 | Josephy et al. | .......... | 428/411.1 |
| 5,605,750 A | * | 2/1997 | Romano et al. | ......... | 428/304.4 |
| 5,662,985 A | | 9/1997 | Jensen et al. | ............... | 428/195 |
| 5,670,448 A | * | 9/1997 | Kometani | ................... | 503/227 |
| 5,672,413 A | | 9/1997 | Taylor et al. | | |
| 5,721,086 A | | 2/1998 | Emslander et al. | ......... | 430/126 |
| 5,728,502 A | | 3/1998 | Ou-Yang et al. | ............ | 430/126 |
| 5,874,158 A | | 2/1999 | Ludwig et al. | ............. | 428/195 |
| 6,045,920 A | | 4/2000 | Ou-Yang et al. | ............ | 428/483 |
| 6,086,987 A | | 7/2000 | Yamanaka et al. | .......... | 428/330 |
| 6,106,982 A | | 8/2000 | Mientus et al. | ............... | 430/14 |
| 6,113,679 A | | 9/2000 | Adkins et al. | ............. | 106/31.6 |
| 6,143,363 A | * | 11/2000 | Noguchi et al. | ............ | 427/261 |
| 6,159,605 A | * | 12/2000 | Hanada et al. | ........... | 428/423.1 |
| 6,177,181 B1 | * | 1/2001 | Hamada et al. | .......... | 428/304.4 |
| 6,379,444 B1 | * | 4/2002 | Adkins et al. | ............. | 106/31.6 |
| 6,428,875 B1 | * | 8/2002 | Takahashi et al. | .......... | 428/172 |

FOREIGN PATENT DOCUMENTS

| | | |
|---|---|---|
| EP | 0 254 365 B1 | 1/1988 |
| EP | 0 464 921 A1 | 1/1992 |
| EP | 0 949 120 A1 | 10/1999 |
| EP | 0 952 005 A1 | 10/1999 |
| EP | 1 020 300 A1 | 7/2000 |
| JP | 9216456 A | 8/1997 |
| WO | WO 98/04418 | 2/1998 |
| WO | WO 98/13731 | 4/1998 |
| WO | WO 00/01536 | 1/2000 |
| WO | WO 00/41890 | 7/2000 |
| WO | WO 00/52532 | 9/2000 |
| WO | WO 02/07984 A2 | 1/2002 |
| WO | WO 02/085638 A1 | 10/2002 |

OTHER PUBLICATIONS

"Ink–Jet Film", Res. Discl. (1999), 425 (Sep.), p. 1178 (No. 42537), Kenneth Mason Publications Ltd.

* cited by examiner

*Primary Examiner*—Cynthia H. Kelly
*Assistant Examiner*—B. Shewareged
(74) *Attorney, Agent, or Firm*—Scott A. Bardell

(57) ABSTRACT

In one aspect, the invention provides an image receptor medium which comprises an extruded image receptive layer that is receptive to solvent-based inkjet ink. Image receptive layers of the invention comprise a blend of an ink absorptive resin and a carrier resin. The ink absorptive resin is compatible with the carrier resin and had a Hildebrand Solubility Parameter within about 3.1 $(MPa)^{1/2}$ of that of the solvent of the ink. In another aspect, the invention provides an image receptor medium which comprises a coextruded or extrusion coated image receptive layer and a core layer bonded together. In other aspects, the invention provides methods of printing images and methods of making an extrusion coated or coextruded image receptor medium.

17 Claims, 1 Drawing Sheet

SOLVENT INKJET INK RECEPTIVE FILMS

FIELD OF THE INVENTION

The present invention relates to films that are receptive to solvent-based inkjet inks and methods of printing onto such films. More specifically, the present invention relates to extruded films that are receptive to solvent-based inkjet inks and methods of printing onto such films. A variety of polymeric sheets may be prepared including various sheeting for signage and commercial graphic films for advertising and promotional displays.

BACKGROUND OF INVENTION

A variety of print methods have been employed for imaging various sheet materials. Commonly employed print methods include gravure, off-set, flexographic, lithographic, electrographic, electrophotographic (including laser printing and xerography), ion deposition (also referred to as electron beam imaging (EBI)), magnetographics, inkjet printing, screen printing, and thermal mass transfer. More detailed information concerning such methods is available in standard printing textbooks.

One of ordinary skill in the art appreciates the differences in these various print methods and recognizes that a combination of ink and receiving substrate that results in high image quality in one printing method often exhibits an entirely different image quality with another print method. For example, in contact printing methods such as screen printing, a blade forces the ink to advance and wet the receiving substrate. Image defects are typically due to a subsequent recession of the ink contact angle with the substrate. In the case of non-contact printing methods, such as inkjet printing, the individual ink drops are merely deposited on the surface. In order to achieve good image quality, the ink drops need to spread, join together, and form a substantially uniform, leveled film. This process requires a low advancing contact angle between the ink and the substrate. For any given ink/substrate combination, the advancing contact angle is typically significantly greater than the receding contact angle. Accordingly, ink/substrate combinations that result in good image quality when printed with contact methods such as screen printing, often exhibit insufficient wetting when imaged with non-contact printing methods such as inkjet printing. Insufficient wetting results in low radial diffusion of the individual ink drops on the surface of the substrate (also referred to as "dot gain"), low color density, and banding effects (e.g., gaps between rows of drops).

Another important difference between screen printing and inkjet printing is the physical properties of the ink. Screen printing ink compositions typically contain over 40% solids and have a viscosity of at least two orders of magnitude greater than the viscosity of inkjet printing inks. It is not generally feasible to dilute a screen printing ink to make it suitable for inkjet printing. The addition of large amounts of low viscosity diluents drastically deteriorates the ink performance and properties, particularly the durability. Further, the polymers employed in screen printing inks are typically high in molecular weight and exhibit significant elasticity. In contrast, inkjet ink compositions are typically Newtonian.

Inkjet printing is emerging as the digital printing method of choice due to its good resolution, flexibility, high speed, and affordability. Inkjet printers operate by ejecting, onto a receiving substrate, controlled patterns of closely spaced ink droplets. By selectively regulating the pattern of ink droplets, inkjet printers can produce a wide variety of printed features, including text, graphics, holograms, and the like. The inks most commonly used in inkjet printers are water-based or solvent-based. Water-based inks require porous substrates or substrates with special coatings that absorb water.

SUMMARY OF THE INVENTION

In one aspect, the invention provides an image receptor medium comprising an extruded image receptive layer that is receptive to solvent-based inkjet ink. The image receptive layer comprises a blend of a) a carrier resin comprising modified polyolefin or poly urethane resin, or combinations thereof and b) an ink absorptive resin compatible with said carrier resin and present in an effective amount and having a Hildebrand Solubility Parameter of said absorptive additive within about 3.1 $(MPa)^{1/2}$ of the solvent of the ink, wherein the image receptive layer has an ink solvent absorption of at least 50% greater than a film of carrier resin alone.

In another aspect, the invention provides a method of printing with an inkjet printer comprising the step of jetting a solvent-based inkjet ink onto an image receptor medium comprising an extruded image receptive layer that is receptive to solvent-based inkjet ink, said image receptive layer comprising a blend of a) carrier resin; and b) an effective amount of ink absorptive resin compatible with said resin and having a Hildebrand Solubility Parameter of said absorptive additive is within about 3.1 $(MPa)^{1/2}$ of the solvent of the ink and wherein the image receptive layer has an ink solvent absorption of at least 50% greater than a film of carrier resin alone.

In another aspect, the invention provides a method of making a multi-layer image receptor medium comprising the step of: coextruding an image receptive layer with a core layer, wherein the image receptive layer comprises a blend of a) carrier resin comprising modified olefin, urethane, or acrylic resin or combinations thereof; and b) an effective amount of ink absorptive resin compatible with said resin and having a Hildebrand Solubility Parameter of said absorptive additive is within about 3.1 $(MPa)^{1/2}$ of the solvent of the ink and wherein the image receptive layer has an ink solvent absorption of at least 50% greater than a film of carrier resin alone.

In yet another aspect, the invention provides an imaged ink receptor media comprising an image receptive layer of the invention having an image printed thereon.

The articles of the invention are useful as an intermediate or as a finished product for signage and commercial graphic films.

DETAILED DESCRIPTION OF THE INVENTION

Figure 1:
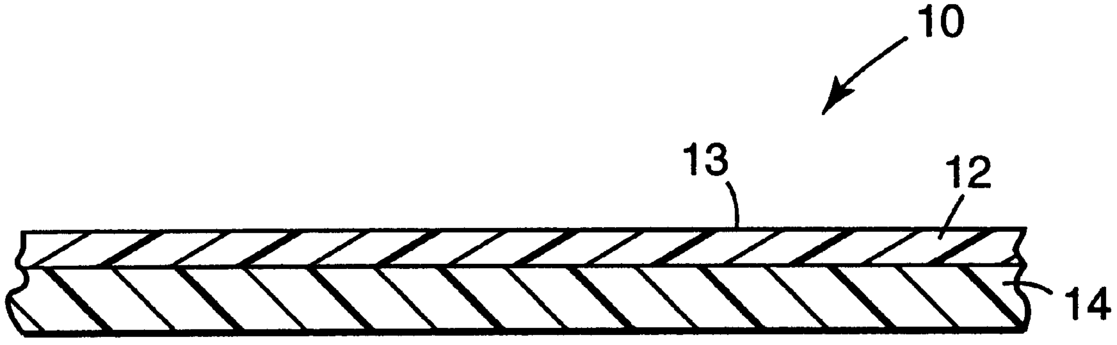
FIG. 1 is a schematic cross-sectional view illustrating an embodiment of the invention including an image receptive layer and a core layer.

In one embodiment, the invention provides an image receptor medium comprising a single extrudable image receptive layer. The image receptive layer is a layer that is receptive to solvent-based inkjet ink. "Solvent-based" means non-aqueous. The image receptive layer comprises a blend of a carrier resin and an ink absorptive resin. In another embodiment shown in FIG. 1, the image receptor medium 10 comprises a core layer 14 having two major surfaces and an image receptive layer 12 in contact and coextruded with, or extrusion coated onto, the core layer 14 to form the image receptor medium 10. Alternatively, an image receptive layer 12 may be extrusion coated directly onto a substrate.

The carrier resin may be any resin or blend of resins that is compatible with the ink absorptive resin described below. An ink absorptive additive resin is compatible with the carrier resin if a film comprising the carrier resin and an ink absorptive resin can be extruded to form a self supporting film or can be coextruded with, or extrusion coated onto, a core layer film as a support. The carrier resins are generally olefin-based. Generally, copolymers comprising the reaction product of olefin monomers and a sufficient amount of at least one polar monomer (modified olefin resins) provide the desired carrier resin. Specific examples of useful copolymers include copolymers of ethylene and vinyl acetate, carbon monoxide, and methyl acrylate; copolymers of acid and/or acrylate modified ethylene and vinyl acetate; and terpolymers of ethylene and any two polar monomers, for example, vinyl acetate and carbon monoxide.

Other useful carrier resins include urethanes and polyesters such as thermoplastic polyurethanes and polyether-ester elastomers. Useful thermoplastic urethane resins include MORTHANE PN343-200, MORTHANE PN 3429-218, MORTHANE PN 03-214, AND MORTHANE L 425 181 from Rohm and Haas, Philadelphia, Pa.; ESTANE 58315 AND ESTANE 58271 and those sold under the trade designation ELASTOLLAN from BF Goodrich, Cleveland, Ohio: TEXIN DP7-3006 AND TEXIN DP7-3007 from Bayer Corporation, Pittsburgh, Pa.; PELLETHANE 2354 AND PELLETHANE 2355 from The Dow Chemical Company, Midland Mich.

Useful polyether-ester resins include HYTREL G3548L; HYTREL G4078W; and HYTREL G4778 from E.I. duPont De Nemours, Wilmington, Del. Other useful copolyester resins include those available from Eastman Chemical, Kingsport, Tenn. under the trade designation EASTAR.

Commercially available modified olefin resins that are useful as carrier resins include: BYNEL 3101, an acid-acrylate modified ethylene vinyl acetate copolymer; ELVALOY 741, a terpolymer of ethylene/vinyl acetate/carbon monoxide; ELVALOY 4924, a terpolymer of ethylene/vinyl acetate/carbon monoxide; ELVALOY 1218AC, a copolymer of ethylene and methyl acrylate; and FUSABOND MG-423D, a modified ethylene/acrylate/carbon monoxide terpolymer. All are available from E.I. duPont De Nemours, Wilmington Del.

Typically the carrier resin is present in the image receptive layer at a level of from about 50 to about 90 weight percent. In other embodiments, the carrier resin is present in the image receptive layer in an amount of from at least about 30 weight percent, at least about 50 weight percent, and least about 70 weight percent.

The ink absorptive resin provides increased solvent absorbency to the image receptive layer such that ink bleeding and running is eliminated during printing. Useful ink absorptive resins are compatible with the carrier resin and have a Hildebrand solubility parameter within about 1.5 $(cal/cm^3)^{1/2}$ $(3.1\ (MPa))^{1/2}$ of the solvent(s) of the ink. "Hildebrand solubility parameter" refers to a solubility parameter represented by the square root of the cohesive energy density of a material, having units of (pressure ) ½, and being equal to $(\Delta H-RT)^{1/2}/V^{1/2}$ where $\Delta H$ is the molar vaporization enthalpy of the material, R is the universal gas constant, T is the absolute temperature, and V is the molar volume of the solvent. Hildebrand solubility parameters are tabulated for solvents in: Barton, A. F. M., *Handbook of Solubility and Other Cohesion Parameters,* 2nd Ed., CRC Press, Boca Raton, Fla. (1991), for monomers and representative polymers in *Polymer Handbook,* 3rd Ed., J. Brandrup & E. H. Immergut, Eds. John Wiley, NY, pp 519–557 (1989), and for many commercially available polymers in Barton, A. F. M., *Handbook of Polymer-Liquid Interaction Parameters and Solubility Parameters*, CRC Press, Boca Raton, Fla. (1990).

In the case of inks comprising a blend of solvents, it is assumed that the solubility parameter of the blend is used. The blend solubility parameter is defined as the calculated weight averaged value of the individual solubility parameters.

Generally, useful ink absorptive additive resins include poly(meth)acrylic resins such as PARALOID and ACRYLOID resins from Rohm and Haas, Philadelphia, Pa., and ELVACITE resins from Ineos Acrylics, Cordova, Tenn.; vinyl resins such as UCAR resins from Union Carbide, Danbury, Conn., a subsidiary of The Dow Chemical Company; and polystyrene resins such as STYRON resins available from The Dow Chemical Company, Midland, Mich. Other vinyl (polyvinyl chloride) resins are available from BF Goodrich Performance Materials, Cleveland, Ohio, and BASF, Mount Olive, N.J. Useful (meth) acrylic resins have a Tg of 90° C. or less.

Specific examples of useful (meth)acrylic resins include copolymers of methyl methacrylate with butyl acrylate, butyl methacrylate, isobutyl methacrylate, or isobornyl methacrylate (e.g., PARALOID DM-55, PARALOID B48N, PARALOID B66, ELVACITE 2550), copolymers of isobutylmethacrylate and butyl methacrylate (e.g., ELVACITE 2046), and isobutyl methacrylate resins (e.g., PARALOID B67). Specific examples of useful vinyl and polystyrene resins include UCAR VYHH, VMCC, and VAGH vinyl resins available from Union Carbide; STYRON 478, 663, 678C, and 693 polystyrene resins from The Dow Chemical Company; and 145D and 148G polystyrene resins from BASF, Mount Olive, N.J. The incorporation of butyl acrylate, butyl methacrylate, isobutyl methacrylate, or isobornyl methacrylate comonomer into methyl methacrylate resins reduces the solubility parameter of the resulting (meth)acrylic resin such that the solubility parameter of the resin more closely matches that of the solvent system in the inks, thereby providing faster solvent absorption for the print receptive blend. The incorporation of these comonomers into (meth) acrylic resin also typically reduces the glass transition temperature of the (meth)acrylic resin which may also facilitate solvent uptake by the image receptive layer. Combinations of such resins may also be used as the ink absorptive resin.

The ink absorptive resin is present in the image receptive layer in an effective amount that improves the ink solvent absorbency by at least 50% over carrier resin(s) alone. For example, if the ink solvent absorption of a carrier rein in film form is 0.010 g/(5.1×5.1 cm) in the first minute, then an at least 50% improvement would result in an ink solvent absorption of 0.015 g/(5.1×5.1 cm) in the first minute. The ink absorptive resin is typically present in the image receptive layers of the invention in an amount of from about 10 to about 50 weight percent and any fractional or whole weight percent between 10 and 50 weight percent. In other embodiments, the ink absorptive resin is present in the image receptive layers of the invention in an amount of from about 10 and about 30, and from about 15 to about 25 weight percent and any fractional or whole weight percent between 10 and 30 and 15 and 25 weight percent respectively. Typically, the image absorptive layer is at least 0.5 mils (12.7 micrometers) thick, and in other embodiments, the print absorptive layer has a thickness that ranges from about 0.7 mils (17.8 micrometers) to about 2.0 mils (50.8 micrometers) thick, and may be any whole or fractional thickness in between 0.7 mils (17.8 micrometers) and 2 mils (50.8 micrometers).

In another embodiment, useful image receptive layers, also have an ink solvent absorption of at least 70% of that of a polyvinyl chloride (PVC) graphics film of equal thickness such as RG 180-10 PVC film, available from Minnesota Mining and Manufacturing Company (3M), St. Paul, Minn. PVC graphics films were chosen as the comparison since such films used in graphics applications have desirable ink solvent absorbency characteristics and provide images having excellent resolution. Such a comparison may be made with generally any PVC film used for commercial graphics applications. In other embodiments, the image receptive layers have an ink solvent absorption of at least 80%, at least 90%, at least 95% of the solvent absorbency of PVC graphics film. Useful image receptive layers may also have an ink solvent absorption greater than that of the PVC graphics film. The ink solvent absorption test is described in more detail in the Examples section of this application and it is to be understood that the test described below is not limited to a particular solvent.

The image receptive layer may include one or more filler materials. Inorganic fillers such as crystalline and amorphous silica, clay particles, aluminum silicate, titanium dioxide and calcium carbonate, and the like are a preferred additive in order to impart one or more of desirable properties such as improved solvent absorption, improved dot gain and color density, and improved abrasion resistance. The concentration of such fillers in the image receptive layers of the invention typically range from about 0.1% to about 25% by weight. In another embodiment, the concentration of such fillers in the image receptive layers of the invention typically range from about 0.5% to about 15% by weight.

To enhance durability of the image receptive layer, especially in outdoor environments exposed to sunlight, a variety of commercially available stabilizing chemicals can be added optionally to the primer compositions. These stabilizers can be grouped into the following categories: heat stabilizers, UV light stabilizers, and free-radical scavengers.

Heat stabilizers are commonly used to protect the resulting image graphic against the effects of heat and are commercially available from Witco Corp., Greenwich, Conn. under the trade designation "Mark V 1923" and Ferro Corp., Polymer Additives Div., Walton Hills, Ohio under the trade designations "Synpron 1163", "Ferro 1237" and "Ferro 1720". Such heat stabilizers can be present in amounts ranging from about 0.02 to about 0.15 weight percent.

Ultraviolet light stabilizers can be present in amounts ranging from about 0.1 to about 5 weight percent of the total primer or ink. Benzophenone type UV-absorbers are commercially available from BASF Corp., Parsippany, N.J. under the trade designation "Uvinol 400"; Cytec Industries, West Patterson, N.J. under the trade designation "Cyasorb UV1164" and Ciba Specialty Chemicals, Tarrytown, N.Y., under the trade designations "Tinuvin 900", "Tinuvin 123" and "Tinuvin 1130".

Free-radical scavengers can be present in an amount from about 0.05 to about 0.25 weight percent of the total primer composition. Nonlimiting examples of free-radical scavengers include hindered amine light stabilizer (HALS) compounds, hydroxylamines, sterically hindered phenols, and the like.

HALS compounds are commercially available from Ciba Specialty Chemicals under the trade designation "Tinuvin 292" and Cytec Industries under the trade designation "Cyasorb UV3581".

In general, the image receptive layer is typically substantially free of colorant. However, it may also contain colorants to provide a uniform background colored film.

In another embodiment of the invention, a core layer 14 is included in the image receptor medium, for example, to reduce the cost and/or enhance the physical properties of the medium. The core layer is most commonly white and opaque for graphic display applications, but could also be transparent, translucent, or colored opaque. Core layer 14 can comprise any polymer having desirable physical properties for the intended application. Properties of flexibility or stiffness, durability, tear resistance, conformability to non-uniform surfaces, die cuttability, weatherability, solvent resistance (from solvents in inks) heat resistance and elasticity are examples. For example, a graphic marking film used in short term outdoor promotional displays typically can withstand outdoor conditions for a period in the range from about 3 months to about one year or more and exhibits tear resistance and durability for easy application and removal.

The material for the core layer is a resin capable of being extruded or coextruded into a substantially two-dimensional film and is preferably resistant to solvents used in inks. "Resistant to solvents in inks" means that the core layer does not absorb significant amounts of the solvents in the ink, and does not allow migration of significant amounts of solvent through the film. If used in combination with an adhesive on the opposite side of the receptor layer, "significant" means the film does not allow enough solvent to pass through the film to negatively impact the adhesion performance of the underlying adhesive layer. For example, the barrier layer would prevent solvents from plasticizing the adhesive layer. Typical solvents used in inkjet inks include 2-butoxyethyl acetate available from Minnesota Mining and Manufacturing Company, Saint Paul, Minn. under the trade designation "3M Scotchcal® Thinner CGS-50", 1-Methoxy-2-Acetoxy-Propane available from under the trade designation "3M Scotchcal® Thinner CGS-10", cyclohexanone, dipropylene glycol methylether acetate, and other acetates such as those sold under the trade designation "Exxate" available from Exxon Chemical, Houston, Tex. Examples of suitable materials core layer include polyester, polyolefin, polyamide, polycarbonate, polyurethane, polystyrene, acrylic, or combinations thereof. In an embodiment where the image receptor layer is extrusion coated onto a core layer, the core layer may comprise materials that have the same physical properties as described above, but may not be extrudable. Examples of such materials include paper, polypropylene, polyethylene terephthalate, polyethylene coated papers, fabrics, nonwoven materials, scrims, and the like.

In another embodiment, the core layer comprises a non-plasticized polymer to avoid difficulties with plasticizer migration and staining in the image receptor medium. In yet another embodiment, the core layer comprises a polyolefin that is a propylene-ethylene copolymer containing about 6 weight percent ethylene. Resins comprising polyvinylchloride may be used as the core layer but are not preferred since such resins may not provide adequate solvent resistance to typical inkjet ink solvents. Such solvents can negatively affect the physical properties of any adhesive that may be part of a graphic film construction.

The core layer may also contain other components such as pigments, fillers, ultraviolet stabilizing agents, slip agents, antiblock agents, antistatic agents, and processing aids familiar to those skilled in the art. The core layer is commonly white opaque, but may also be transparent, colored opaque, or translucent.

A typical thickness of the core layer 14 is in the range from 0.5 mil (12.7 micrometers) to 12 mils (305 micrometers). However, the thickness may be outside this range providing the resulting image receptor medium is not too thick to feed into the printer or image transfer device of choice. A useful thickness is generally determined based on the requirements of the desired application.

Optional Prime Layer

Figure 2:
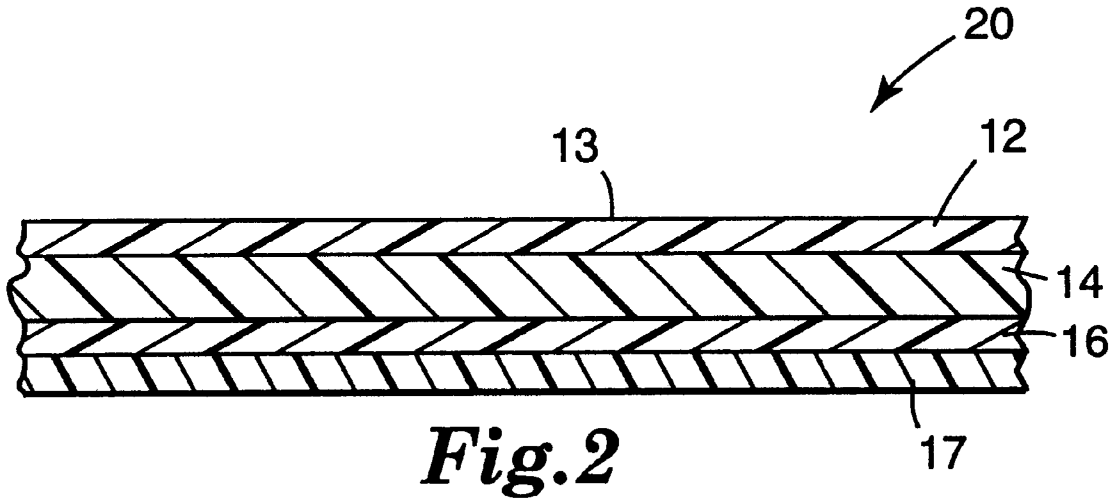
FIG. 2 is 1 is a schematic cross-sectional view illustrating an embodiment of the invention including an image receptive layer and a core layer and an optional prime layer.

As illustrated in FIG. 2, optional prime layer 16 is located on the surface of core layer 14 opposite image receptive layer 12. In the case where the image receptor medium does not include a core layer (not shown), the prime layer is located on the surface of the image receptive layer 12 opposite the outer surface 13. The prime layer serves to increase the bond strength between the substrate layer and an adhesive layer 17 if the bond strength is not sufficiently high without the prime layer. The presence of an adhesive layer makes the image receptor medium useful as an adhesive backed graphic marking film.

Although it is preferable to use a pressure sensitive adhesive, any adhesive that is particularly suited to the substrate layer and to the selected application can be used. Such adhesives are those known in the art and may include aggressively tacky adhesives, pressure sensitive adhesives, repositionable or positionable adhesives, hot melt adhesives, and the like.

Optional Tie Layer

The image receptor media of the invention may also have an optional tie layer (not shown) between image receptive layer 12 and the core layer 14. A tie layer is used to improve adherence between the image receptive layer and the core layer. Useful tie layers include extrudable resins such as ethylene vinyl acetate resins, and modified ethylene vinyl acetate resins (modified with acid, acrylate, maleic anhydride, individually or in combinations). The tie layer may consist of these materials by themselves or as blends of these resins with the carrier resin. Use of tie layer resins is well known in the art and varies depending on the composition of the two layers to be bonded. Tie layers for extrusion coating could include the same types of materials listed above and other materials such as polyethyleneimine which are commonly used to enhance the adhesion of extrusion coated layers. Tie layers can be applied to the core layer or ink absorptive layer by coextrusion, extrusion coating, laminating, or solvent coating processes. The inks particularly useful in combination with the coextruded construction of the invention include the Scotchcal™ 3700 series and Scotchcal™ 4000 series solvent-based piezo inkjet inks, available from Minnesota Mining and Manufacturing Company, St. Paul, Minn., the UltraVu series solvent-based piezo inkjet inks, available from VUTEk, Meredith, N.H., and the Arizona 1100-3 solvent-based inks, available from RasterGraphics of the Gretag Imaging Group, San Jose, Calif. Such inks typically consist of a colorant, dye, or pigment, a dispersant if pigment is used, a binder, and a blend of solvents. Additional optional components include stabilizers, flow agents, viscosity modifiers, and others. A detailed description of a typical solvent-based inkjet ink formulation can be found in U.S. Pat. No. 6,113,679.

The image receptor medium of this invention can be made by a number of methods. For example, image receptive layer 12 and optional layers 14 and 16 can be coextruded using any suitable type of coextrusion die and any suitable method of film making such as blown film extrusion or cast film extrusion. Alternatively, layer 12 can be extrusion coated onto a substrate or a core layer or other support. Adhesive layer 17 may be coextruded with the other layers, transferred to the image receptor medium from a liner, or directly coated onto the image receptor medium in an additional process step. For the best performance in coextrusion, the polymeric materials for each layer are chosen to have similar properties such as melt viscosity. Techniques of coextrusion are found in many polymer processing references, including Progelhof, R. C., and Throne, J. L., "Polymer Engineering Principles", Hanser/Gardner Publications, Inc., Cincinnati, Ohio, 1993. Alternatively, one or more of the layers may be extruded as a separate sheet and laminated together to form the image receptor medium. The finished image receptor medium does not require surface treatment methods such as corona treatment to improve the image receptivity of the image receptor medium for certain applications, as described in the prior art.

The imaged, polymeric sheets may be a finished product or an intermediate and are useful for a variety of articles including signage and commercial graphics films. Signage include various retroreflective sheeting products for traffic control as well as non-retroreflective signage such as backlit signs.

The article is suitable for use as roll-up signs, flags, banners and other articles including other traffic warning items such as roll-up sheeting, cone wrap sheeting, post wrap sheeting, barrel wrap sheeting, license plate sheeting, barricade sheeting and sign sheeting; vehicle markings and segmented vehicle markings; pavement marking tapes and sheeting; as well as retroreflective tapes. The article is also useful in a wide variety of retroreflective safety devices including articles of clothing, construction work zone vests, life jackets, rainwear, logos, patches, promotional items, luggage, briefcases, book bags, backpacks, rafts, canes, umbrellas, animal collars, truck markings, trailer covers and curtains, etc.

Commercial graphic films include a variety of advertising, promotional, and corporate identity imaged films. The films typically comprise a pressure sensitive adhesive on the non-viewing surface in order that the films can be adhered to a target surface such as an automobile, truck, airplane, billboard, building, awning, window, floor, etc.

Objects and advantages of the invention are further illustrated by the following examples, but the particular materials and amounts thereof recited in the examples, as well as other conditions and details, should not be construed to unduly limit the invention. All parts, percentages and ratios herein are by weight unless otherwise specified.

EXAMPLES

Glossary

"ABC 5000" is an antiblock concentrate resin in polyethylene carrier and was available from Polyfil Corporation, Rockaway, N.J.

"Black Conc." is 2161 Black Concentrate and was available from PolyOne Southwest, Seabrook, Tex.

"BYNEL 3101" is an acid/acrylate modified ethylene vinyl acetate resin and was available from E.I. duPont De Nemours (DuPont), Wilmington, Del.

"BYNEL 2002" is an acid modified ethylene acrylate and was available from DuPont.

"ELVALOY 741" is a terpolymer of ethylene/vinyl acetate/carbon monoxide/ethylene and was available from DuPont.

"ELVALOY 4924" is a terpolymer of ethylene/vinyl acetate/carbon monoxide/ethylene and was available from Dupont.

"ELVALOY 1218AC" is a copolymer of ethylene and methyl acrylate and was available from Dupont.

"ELVAX 3170" is ethylene vinyl acetate copolymer (18% vinyl acetate) and was available from DuPont.

"3135B EVA" is an ethylene vinyl acetate copolymer (12% vinyl acetate) and was available from DuPont.

"FYREBLOCK 5DB-370P5" is a flame retardant concentrate and was available from Great Lakes Chemical, Indianapolis, Ind.

"HYTREL 4078" is a polyether-ester elastomer and was available from DuPont.

"LDPE" is Exxon 129.24 low density polyethylene and was available from Exxon Chemical, Houston, Tex.

"LLDPE" is Dow linear low density polyethylene 2045 and was available from The Dow Chemical Company, Midland, Mich.

"MORTHANE PN 343-200 is thermoplastic polyurethane and was available from Rohm and Haas, Philadelphia, Pa.

"MT 5000" is a talc concentrate and was available from Polyfil Corporation, Rockaway, N.J.

"R104" is a rutile titanium dioxide and was available from DuPont.

"RG 180-10 film" is a cast polyvinyl chloride film (2 mil (50.8 micrometers)) having a PSA and PSA liner and was available from 3M.

"Standridge 11937" is 11937 white concentrate and was available from Standridge Color Corporation, Social Circle, Ga.

"UV 10407" is Ampacet 10407 and was available from Ampacet Corporation, Tarrytown, N.J.

"Z9470 PP/PE copolymer" is a random copolymer of polypropylene and ethylene and was available from Fina Oil and Chemical Company, LaPorte, Tex.

Test Methods

Printing was conducted on all the film samples using an Arizona Digital Screen Press (available from RasterGraphics, a member of Gretag Imaging Group, San Jose, Calif.; and Scotchcal® 3700 series piezo inkjet inks, available from 3M. A particular photographic image having a range of print densities was chosen as the test image, and the printer was operated in 6 color 8 pass mode with a dryer temperature setting of 45° C. and no overstrike (all ink settings at 100%). Pieces of the films to be printed were taped onto RG 180-10 film threaded through the printer.

Dot Size of an individual printed ink dot was measured on the image receptor film using an optical microscope. The reported value was obtained by averaging the diameter of six different dots. For the print resolution employed in the examples (approximately 300×300 dpi), the theoretical ink dot diameter should be greater than $2^{1/2}$/dpi (120 micrometers) but no more than 2/dpi (170 micrometers).

Percent adhesion ("Adhesion (%)") was the adhesion of the ink to the substrate or primer measured on the articles. The articles were conditioned at room temperature at least 24 hours prior to adhesion measurement, which was conducted according to the procedure set out in ASTM D 3359-95A Standard Test Methods for Measuring Adhesion by Tape Test, Method B.

Qualitative evaluation of image quality for the various print receptive films was accomplished by observing running or bleeding of the ink during printing, if any; the resolution of the image; and the color density relative to an RG 180-10 film. These qualitative evaluations are reported as "comments" in the tables below.

The rate of ink solvent absorption into the various ink receptive layers was quantitatively evaluated by measuring the sorption rate of 2-butoxyethyl acetate into the layers. 2-Butoxyethyl acetate is the primary solvent in the Scotchcal® 3700 series piezo inkjet inks, and has a solubility parameter of 8.5 $(cal/cm^3)^{1/2}$ (17.3 $(Mpa)^{1/2}$). Films of the ink receptive layers were made using the extrusion conditions described below. To make the absorption measurements, a 3×3 inch (7.6×7.6 cm) piece of the film to be tested was weighed and taped onto a glass plate with four pieces of Scotch Brand #471 vinyl tape such that a 2×2 inch (5.1×5.1 cm) square frame was formed by the four pieces of tape. The 2-butoxyethyl acetate solvent was then applied to, and spread across, this 2×2 inch (5.1×5.1 cm) area of film with a disposable pipette and allowed to dwell for 1 minute, followed by removing any solvent not absorbed with an absorbent paper towel. The tape was removed and the film was immediately reweighed to determine the amount of solvent absorbed.

Solid block color density was measured quantitatively for some films, printed with 100% coverage of black ink, using a Gretag SPM-55 densitometer, available from Gretag-MacBeth AG, Regensdorf, Switzerland. No background subtraction was used, and the reported values are the average of three measurements. An increase in color density generally correlates to an increase in solid ink fill and improved dot gain.

Films (0.1 mm thick) of carrier resin/ink absorptive resin blends were extruded using a ¾inch (1.9 cm) Brabender extruder. No pre-compounding of the resins was done; however, a screw with a mixing element was used in the extruder. The extruder zone temperatures were: Z1=180° C., Z2=190° C., and Z3=200° C., and the die was at 200° C. The films were cast onto 15.24 cm wide polyethylene terephthalate (PET) core layer film and were solidified by passing through a chilled three roll stack.

Examples 1–12 and Comparative Examples C 1–C 9

Table 1 shows the compositions of the image receptive layers of the image receptor films that were imaged. Table 2 summarizes the results of the piezo inkjet print testing. A description of the ink absorptive resins used in the ink receptive films is given in Table 3.

TABLE 1

| Sample | Description (weight percent) |
|---|---|
| C 1 | RG180-10 vinyl film |
| C 2 | BYNEL 3101 |
| C 3 | ELVALOY 741 |
| C 4 | (78/22) BYNEL 3101/ELVALOY 741 |
| C 5 | (60/40) BYNEL 3101/ELVALOY 741 |
| C 6 | (65/18/17) BYNEL 3101/ELVALOY 741/ELVACITE 2008 |
| Ex 1 | (65/18/17) BYNEL 3101/ELVALOY 741/PARALOID B48N |
| Ex 2 | (65/18/17) BYNEL 3101/ELVALOY 741/ELVACITE 2550 |
| Ex 3 | (65/18/17) BYNEL 3101/ELVALOY 741/ELVACITE 2046 |
| Ex 4 | (71/20/9) BYNEL 3101/ELVALOY 741/PARALOID DM55 |
| Ex 5 | (65/18/17) BYNEL 3101/ELVALOY 741/PARALOID DM55 |
| Ex 6 | (65/18/17) BYNEL 3101/ELVALOY 741/PARALOID B67 |
| Ex 7 | (80/20) BYNEL 3101/PARALOID B66 |
| Ex 8 | (60/40) BYNEL 3101/PARALOID B66 |
| C 7 | (65/18/17) BYNEL 2002/ELVALOY 741/PARALOID B66 |
| Ex 9 | (65/18/17) ELVALOY 4924/ELVALOY 741/PARALOID B67 |
| Ex 10 | (65/18/17) ELVALOY 1218AC/ELVALOY 741/PARALOID |

TABLE 1-continued

| Sample | Description (weight percent) |
|---|---|
| | B67 |
| Ex 11 | (80/20) MORTHANE PN 343-200/PARALOID B66 |
| Ex 12 | (80/20) HYTREL 4078/ELVACITE 2046 |
| C 8 | MORTHANE PN 343-200 |
| C 9 | HYTREL 4078 |

TABLE 2

| Sample | Comments | Ink Adhesion (%) | Dot Size (micrometers) | Solvent Absorption g/ (5.1 × 5.1 cm) min | Absorption (% of vinyl C 1) |
|---|---|---|---|---|---|
| C 1 | Ink does not run or bleed, good resolution, excellent color density | 100 | 161 | 0.022 | — |
| C 2 | Ink runs a lot, poor resolution | 100 | 185 | 0.006 | 27.3 |
| C 3 | Ink does not run or bleed, excellent resolution, poor color density | 100 | 94 | 0.049 | 223 |
| C 4 | Ink runs and bleeds, poor resolution mottle pattern in ink | 100 | — | 0.010 | 45.4 |
| C 5 | Ink bleeds slightly | 100 | — | 0.011 | 50 |
| C 6 | Ink bleeds, poor resolution | 100 | — | 0.010 | 45.4 |
| Ex 1 | Slight ink bleed in darker regions | 100 | — | 0.015 | 68.2 |
| Ex 2 | No ink bleed, excellent resolution | 100 | — | 0.019 | 86.4 |
| Ex 3 | No ink bleed, excellent resolution | 100 | — | 0.020 | 90.9 |
| Ex 4 | Slight ink bleed in darker regions | 100 | — | 0.015 | 68.2 |
| Ex 5 | No ink bleed, excellent resolution | 100 | — | 0.024 | 109 |
| Ex 6 | No ink bleed, excellent resolution | 100 | — | 0.034 | 154 |
| Ex 7 | Slight ink bleed in darker regions | 100 | — | 0.011 | 50 |
| Ex 8 | No ink bleed, good resolution | 100 | — | 0.021 | 95.4 |
| C 7 | Ink runs a lot, very poor image | 100 | — | 0.005 | 22.7 |
| Ex 9 | No ink bleed, excellent resolution | 100 | — | 0.039 | 177 |
| Ex 10 | No ink bleed, good resolution | 100 | — | 0.028 | 127 |
| Ex 11 | No ink bleed, excellent resolution | 100 | — | 0.042 | 191 |
| Ex 12 | No ink bleed, excellent resolution | 100 | — | 0.043 | 195 |
| C 8 | Ink runs, poor image | 100 | — | 0.013 | 59.1 |
| C 9 | Ink bleeds, poor image | 100 | — | 0.017 | 77.2 |

TABLE 3

| Resin | Composition | Tg (° C.) | Solubility Parameter $(cal/cm^3)^{1/2}$ $[MPa]^{1/2}$ |
|---|---|---|---|
| ELVACITE 2008 | MMA | 105 | 9.4 [19.2] |
| PARALOID B48N | MMA/BA | 50 | 9.3 [19] |
| ELVACITE 2550 | MMA/n-BMA | 36 | — |
| ELVACITE 2046 | n-BMA/iso-BMA | 35 | 9.2 [18.8] |
| PARALOID DM55 | MMA/IBMA | 70 | 9.4 [19.2] |
| PARALOID B67 | iso-BMA | 50 | 8.6 [17.6] |
| PARALOID B66 | MMA/BMA | 50 | 9.0 [18.4] |

In all samples, ink picking was not detected after the Ink Adhesion Test, indicating reasonably good ink adhesion.

The data in Table 2 show that an image receptive layer made solely from BYNEL 3101 resin (Comparative Example C 2) did not have sufficient ink solvent absorbency to prevent the ink from running and bleeding. In contrast, the data show that an image receptive layer made solely from ELVALOY 741 (Comparative Example C 3) had adequate solvent absorbency, and provided good image resolution, but gave insufficient dot gain and poor color density. Films or layers made from ELVALOY 741 were very soft resulting in poor abrasion resistance.

The data in Table 2 show that the addition of 20–40 weight percent ELVALOY 741 to BYNEL 3101 increased the solvent absorbency of the image receptive layer compared to a layer made from BYNEL 3101 alone. However, solvent absorbency was still not adequate (Comparative Examples C 4 and C 5).

The data in Table 2 show that the addition of (meth) acrylic resins at a level of about 17 weight percent resulted in a significant increase in solvent absorbency of BYNEL 3101/ELVALOY 741 films (Examples 1, 2, 3, 5, and 6). The addition of a poly methyl methacrylate resin to the BYNEL 3101/ELVALOY 741 blend (Comparative Example C 6) did not provide adequate solvent absorbency. Example 1 provided about 50% higher solvent absorption than Comparative Example C 4, which contained no solvent absorptive resin.

Examples 2, 3, 5, and 6 provided even higher solvent absorption than Example 1. The image receptive layers of Examples 2, 3, 5, and 6 did not exhibit any ink bleeding and the resolution of the printed images were excellent. Example 4 showed that reducing the level of the ink absorptive resin (as compared to Example 5) results in a slight bleeding of the printed image due to the reduced solvent absorption.

Example 8 showed that a blend of BYNEL 3101 with an ink absorptive resin can provide sufficient solvent absorbency and good print performance.

Comparative Example C 7 showed that not all modified olefin resins can be used as the base resin in such print receptive blends, since using BYNEL 2002 instead of BYNEL 3101 (Example 1) resulted in deteriorated image quality and poor ink absorption.

The color densities of Comparative Examples C 1 and C 4 and Examples 1 and 5 were 2.00, 1.38, 1.55, and 1.72, respectively. The addition of acrylic resin to the carrier resin of Comparative Example C 4 resulted in an increase in black color density. An acceptable color density is at least about 1.5.

Examples 13–21

Three layer films were produced on a blown film line substantially as described in U.S. Pat. No. 5,721,086, except corona treatment was not used. The three extruders were set at Z1=130° C., Z2=Z3=200° C. and the die was set at 200 ° C. For the image receptive layers, the modified EVA carrier resins and acrylic resins were dry blended and then fed into the extruder, except for Examples 17 and 18 for which the BYNEL 3101, ELVALOY 741, and acrylic resins were pre-compounded using a twin screw extruder, and then pelletized.

The descriptions of the blown film constructions are given in Table 4 and consist of an olefin core layer, with an adhesive prime layer on one side and an image receptive layer on the other side.

For all films below, the adhesive prime layer composition was 80/12/4/4 ratio of 3135B EVA/MT 5000/ABC 5000/UV 10407 and the adhesive prime layer was 0.5 mils (12.7 micrometers) thick.

TABLE 4

| | Core Layer Composition | Image Receptive Layer Composition | Total Film Thickness (mils; micrometers) | Image Receptive Layer Thickness (mils; micrometers) |
|---|---|---|---|---|
| C 10 | A | 74.6/21.1/4.3 BYNEL 3101/ ELVALOY 741/UV 10407 | 3.1 (78.7) | 0.8 (20.3) |
| Ex 13 | A | 67.8/19.2/3.9/9.1 BYNEL 3101/ ELVALOY 741/UV 10407/ PARALOID DM55 | 3.1 (78.7) | 0.8 (20.3) |
| Ex 14 | A | 62.2/17.6/2.6/16.7 BYNEL 3101/ ELVALOY 741/UV 10407/ PARALOID DM55 | 3.1 (78.7) | 0.8 (20.3) |
| Ex 15 | A | 67.8/19.2/3.9/9.1 BYNEL 3101/ ELVALOY 741/UV 10407/ PARALOID B67 | 3.1 (78.7) | 0.8 (20.3) |
| Ex 16 | A | 62.2/17.6/2.6/16.7 BYNEL 3101/ ELVALOY 741/UV 10407/ PARALOID B67 | 3.1 (78.7) | 0.8 (20.3) |
| Ex 17 | A | 62.2/17.6/2.6/16.7 BYNEL 3101/ ELVALOY 741/UV 10407/ PARALOID DM55 | 4.2 (107) | 0.5 (12.7) |
| Ex 18 | A | 62.2/17.6/2.6/16.7 BYNEL 3101/ ELVALOY 741/UV 10407/ ELVACITE 2550 | 3.0 (76.2) | 0.9 (22.9) |
| Ex 19 | A | 62.2/17.6/2.6/16.7 BYNEL 3101/ ELVALOY 741/UV 10407/ PARALOID B66 | 3.0 (76.2) | 0.9 (22.9) |
| Ex 20 | B | 62.2/17.6/2.6/16.7 BYNEL 3101/ ELVALOY 741/UV 10407/ PARALOD B48N | 3.5 (88.9) | 0.7 (17.8) |
| C 11 | B | 95.5/4.5 ELVALOY 4924/UV 10407 | 3.5 (88.9) | 1.2 (30.5) |
| Ex 21 | B | 78.7/16.8/4.5 ELVALOY 4924/ B67/UV 10407 | 3.5 (88.9) | 1.2 (30.5) |

Core A = 60.0/17.8/4.2/18.0 Z9470 PE-PP/ELVAX 3170/UV 10407/STANDRIDGE 11937
Core B = 58.5/15.0/4.5/22.0 129.24 LDPE/ELVAX 3170/UV 10407/STANDRIDGE 11937

The image receptor films described in Table 4 were printed using the Arizona printer, as described above. Comments concerning the printing and image quality, results of ink adhesion testing, and ink dot size measurements, are shown in Table 5.

TABLE 5

| | Comments | Ink Adhesion (%) | Dot Size (micrometers) |
|---|---|---|---|
| C 10 | Ink bleeds a lot and runs in darker areas of image, poor color density | 100 | 108 |
| Ex 13 | Slight ink bleed in darker areas of image | 100 | |
| Ex 14 | No ink bleed, good image resolution, good color density | 100 | 141 |
| Ex 15 | Slight ink bleed in darker areas of image | 100 | |
| Ex 16 | No ink bleed, good image resolution, good color density | 100 | 122 |
| Ex 17 | Slight ink bleed in darker areas of image | 100 | |
| Ex 18 | No ink bleed, good image resolution | 100 | 116 |
| Ex 19 | No ink bleed, good image resolution | 100 | 122 |
| Ex 20 | Very slight ink bleed in darker regions, good color density | 100 | 128 |
| C 11 | Ink bleed in darker areas, soft film | 100 | |
| Ex 21 | No ink bleed, good image resolution | 100 | |

Comparative Example C 10 showed that an image receptive layer without an ink absorptive resin resulted in ink bleed. Examples 13–21 showed that the addition of an acrylic ink absorptive resin improved ink solvent absorbency.

Example 16 showed that decreasing the thickness of the image receptive layer resulted in poorer print performance as compared to Example 12.

TABLE 7

| | A (Weight %) | B (Weight %) | C (Weight %) | D (Weight %) | E (Weight %) | F (Weight %) | G (Weight %) |
|---|---|---|---|---|---|---|---|
| BYNEL 3101 | 62 | — | — | — | — | — | 62 |
| ELVALOY 741 | 16.7 | — | — | — | — | — | 16.7 |
| PARALOID B67 | 16.8 | — | — | — | — | — | 16.8 |
| UV 10407 | 4.5 | 3.4 | 3.4 | | 3.4 | 3.4 | 4.5 |
| LLDPE | — | 54 | 54 | 63.9 | 54 | 54 | — |
| LDPE | — | 8 | 8 | 16.7 | 8 | 8 | — |
| Standridge 11937 | — | 14.6 | 14.6 | | 14.6 | 14.6 | |
| FRYREBLOCK | — | 20 | 20 | 16.7 | 20 | 20 | — |
| Black Conc. | — | | | 2.7 | — | — | — |

Examples 22–23

Example 22 was a multi-layered single side printable banner produced using a conventional blown film coextrusion process substantially as described in U.S. Pat. No. 5,721,086, except corona treatment was not used. Each of the seven extruders A, B, C, D, E, F, G supplied a melt formulation to an annular die where the melts were combined to form a single molten stream consisting of seven distinct layers in a sleeve shape. The melt of extruder A formed the image receptor layer, and the melt of extruders B, C, D, E, F, G formed the substrate layers. The molten polymer sleeve was then blown to its final diameter and thickness by introducing air into the sleeve and trapping it between the die and nip rolls at the top of the blown film tower. The film sleeve was then slit into two flat film webs, and wound onto a core. The resulting sample had a thickness of about 12 mils (300 micrometers). This banner material was printed on a VUTEk 2360SC inkjet printer running at both Ultra (200 SF/H) and Enhanced (400 SF/H) speeds with 100° F. (38° C.) preheat and 140° F. (60° C.) on the remaining heater sections using Scotchcal® 2300 series inks available from 3M. Each sample showed good solvent absorbency. The image showed good resolution and color density. The formulations data are shown in Table 6.

TABLE 6

| | A (weight %) | B (weight %) | C (weight %) | D (weight %) | E (weight %) | F (weight %) | G (weight %) |
|---|---|---|---|---|---|---|---|
| BYNEL 3101 | 62 | — | — | — | — | — | |
| ELVALOY 741 | 16.7 | — | — | — | — | — | |
| PARALOID B67 | 16.8 | — | — | — | — | — | — |
| UV 10407 | 4.5 | 3.4 | 3.4 | — | 3.4 | 3.4 | 3.4 |
| LLDPE | — | 54 | 54 | 63.9 | 54 | 54 | 54 |
| LDPE | — | 8 | 8 | 16.7 | 8 | 8 | 8 |
| Standridge 11937 | — | 14.6 | 14.6 | | 14.6 | 14.6 | 14.6 |
| FRYREBLOCK 5DB-370P5 | — | 20 | 20 | 16.7 | 20 | 20 | 20 |
| Black Conc. | — | — | — | 2.7 | — | — | — |

Example 23 was a multi-layered two side printable banner produced using a conventional blown film coextrusion process as described above in Example 22. The resulting sample had a thickness of about 12 mils (300 micrometers). This banner material was printed on both sides as described immediately above. The image receptive layers provided good solvent absorbency. The images had good resolution and color density. The formulations data is shown in Table 7.

All patents, patent applications, and publications cited herein are each incorporated by reference, as if individually incorporated. The various modifications and alterations of this invention will be apparent to those skilled in the art without departing from the scope and spirit of this invention. This invention should not be restricted to that set forth herein for illustrative purposes.

What is claimed is:

1. An image receptor medium comprising an extruded image receptive layer that is receptive to solvent-based inkjet ink, said image receptive layer comprising a blend of a) a carrier resin comprising modified polyolefin or poly urethane resin, or combinations thereof and b) an ink absorptive resin compatible with said carrier resin and present in an effective amount and selected from the group consisting of copolymers of methyl methacrylate with butyl acrylate, butyl methacrylate, isobutyl methacrylate, or isobornyl methacrylate; copolymers of isobutylmethacrylate and butyl methacrylate; butyl methacrylate resins; polystyrene resins; polyvinyl chloride; and combinations thereof.

2. The image receptor medium of claim 1 wherein the modified polyolefin resin is the reaction product of an olefin monomer and a polar monomer.

3. An imaged graphics film comprising the image receptor medium of claim 1 having an ink jetted image on a surface of the image receptor medium.

4. The image receptor medium of claim 1 wherein acrylic ink absorptive resin is present in the image receptive layer at a level of from about 10 to about 50 weight percent.

5. The image receptor medium of claim 1 further comprising a coextruded core layer bonded to said image receptive layer.

6. The image receptor medium of claim 1 further comprising an extrusion coated core layer bonded to said image receptive layer.

7. The image receptor medium of claim 5 wherein the core layer is non-plasticized.

8. The image receptor medium of claim 5 wherein the core layer comprises polyester, polyolefin, polyamide, polycarbonate, polyurethane, polystyrene, acrylic, or combinations thereof.

9. The image receptor medium of claim 5 wherein the core layer has an adhesive on a surface opposite the image receptive layer.

10. The image receptor medium of claim 9 having a prime layer between the adhesive and the core layer.

11. The image receptor medium of claim 1 wherein the image receptive layer comprises a carrier resin selected from the group consisting of acid/acrylate modified ethylene vinyl acetate resin, terpolymer of ethylene/vinyl acetate/carbon monoxide/ethylene, and combinations thereof.

12. The image receptor medium of claim 1 wherein the image receptive layer comprises an ink absorptive resin selected from the group consisting of a copolymer of methylmethacrylate and butylacrylate, a copolymer of methylmethacrylate and isobutylmethacrylate, and combinations thereof.

13. The image receptor medium of claim 6 wherein the core layer is resistant to acetate solvents.

14. The image receptor medium of claim 6 further comprising a tie layer between said core layer and said image receptive layer.

15. An imaged graphics film comprising the image receptor medium of claim 5 having an ink jetted image on a surface of the image receptor medium.

16. An imaged graphics film comprising the image receptor medium of claim 6 having an ink jetted image on a surface of the image receptor medium.

17. An imaged graphics film comprising the image receptor medium of claim 9 having an ink jetted image on a surface of the image receptor medium.

* * * * *

UNITED STATES PATENT AND TRADEMARK OFFICE

CERTIFICATE OF CORRECTION

PATENT NO. : 6,589,636 B2
APPLICATION NO. : 09/896497
DATED : July 8, 2003
INVENTOR(S) : Jeffrey O. Emslander It is certified that error appears in the above-identified patent and that said Letters Patent is hereby corrected as shown below:

Column 10
Line 36, after "was" insert -- set --.

Column 13
Table 4, under heading "Image Receptive Layer Composition", Example 20, delete "PARALOD" and insert -- PARALOID --, therefor.

Signed and Sealed this

Fourteenth Day of November, 2006

JON W. DUDAS
*Director of the United States Patent and Trademark Office*